US012190893B2

(12) United States Patent
Berkeland et al.

(10) Patent No.: US 12,190,893 B2
(45) Date of Patent: Jan. 7, 2025

(54) SYSTEMS AND METHODS FOR VERIFYING IDENTITY USING BIOMETRIC DATA

(71) Applicant: VONAGE BUSINESS INC., Atlanta, GA (US)

(72) Inventors: Mark Berkeland, San Jose, CA (US); Angel Esteban Garcia, Miami, FL (US)

(73) Assignee: Vonage Business Inc., Holmdel, NJ (US)

( * ) Notice: Subject to any disclaimer, the term of this patent is extended or adjusted under 35 U.S.C. 154(b) by 71 days.

(21) Appl. No.: 17/345,690

(22) Filed: Jun. 11, 2021

(65) Prior Publication Data

US 2021/0390962 A1 Dec. 16, 2021

Related U.S. Application Data

(60) Provisional application No. 63/037,648, filed on Jun. 11, 2020.

(51) Int. Cl.
*G10L 17/24* (2013.01)
*G10L 17/06* (2013.01)

(52) U.S. Cl.
CPC ............. *G10L 17/24* (2013.01); *G10L 17/06* (2013.01)

(58) Field of Classification Search
CPC ......... G10L 17/00; G10L 17/20; G10L 17/22; G10L 17/24; G10L 17/26; G10L 17/04; G10L 17/06; G10L 17/10; G10L 17/12; G10L 17/14; G06F 21/32; G06Q 20/3255; G06Q 20/3272; G06Q 20/40145; H04L 9/3231; H04L 63/0853; H04L 63/0861
See application file for complete search history.

(56) References Cited

U.S. PATENT DOCUMENTS

| 9,639,682 | B2 * | 5/2017 | North ..................... G06F 21/32 |
| 9,728,028 | B1 * | 8/2017 | Chemla .............. G06Q 20/4014 |
| 10,049,362 | B2 * | 8/2018 | Mushing ................ G07C 9/257 |
| 11,438,330 | B2 * | 9/2022 | Garcia ................ H04L 63/0861 |
| 2006/0190264 | A1 | 8/2006 | Jaramillo et al. |
| 2006/0286969 | A1 * | 12/2006 | Talmor .................... G06F 21/32 |
| | | | 379/142.01 |

(Continued)

FOREIGN PATENT DOCUMENTS

EP 2966608 A1 * 1/2016 ............. G06F 21/32

OTHER PUBLICATIONS

International Search Report for PCT/US2021/037036 dated Oct. 20, 2021.
Written Opinion for PCT/US2021/037036 dated Oct. 20, 2021.

*Primary Examiner* — Paras D Shah
*Assistant Examiner* — Nadira Sultana
(74) *Attorney, Agent, or Firm* — FisherBroyles, LLP; Joseph Pagnotta

(57) ABSTRACT

A system for registering an individual's biometric data and then later verifying the identity of the individual using the previously registered biometric data makes use of either an audio communications channel or a messaging channel, both of which are accessed via an application programming interface (API). In some instances, spoken audio input is received from the individual and the spoken audio input is used to generate a voice print for the individual. In other instances, the biometric data could be image-based, such as facial images or an image of an individual's iris.

22 Claims, 11 Drawing Sheets

(56) References Cited

U.S. PATENT DOCUMENTS

| | | | | |
|---|---|---|---|---|
| 2007/0055517 A1* | 3/2007 | Spector | ............... | G07C 9/37 |
| | | | | 704/E17.016 |
| 2007/0190975 A1* | 8/2007 | Eonnet | ............... | H04W 12/35 |
| | | | | 455/411 |
| 2009/0249454 A1* | 10/2009 | Yamamoto | ............... | H04L 67/54 |
| | | | | 726/5 |
| 2010/0131273 A1* | 5/2010 | Aley-Raz | ............... | G10L 17/24 |
| | | | | 704/247 |
| 2011/0276486 A1* | 11/2011 | Kuba | ............... | G06Q 20/401 |
| | | | | 340/5.83 |
| 2013/0219422 A1* | 8/2013 | Kambampati | ... | H04N 21/25866 |
| | | | | 725/48 |
| 2013/0339745 A1* | 12/2013 | Gramelspacher | ....... | G06F 21/36 |
| | | | | 713/183 |
| 2016/0300576 A1* | 10/2016 | Karpey | ............... | G10L 17/24 |
| 2018/0232511 A1* | 8/2018 | Bakish | ............... | G06F 21/32 |

* cited by examiner

SYSTEMS AND METHODS FOR VERIFYING IDENTITY USING BIOMETRIC DATA

This application claims the benefit of the filing date of U.S. Provisional Patent Application No. 63/037,648, which was filed Jun. 11, 2020, the contents of which are hereby incorporated by reference.

BACKGROUND OF THE INVENTION

The present application relates to identity verification services. Specifically, the invention relates to a verification service that is capable of verifying the identity of an individual using an audio communications channel or a messaging channel.

Existing identity verification systems typically use two factor authentication schemes. In the most commonly used schemes, an identity verification system sends a verification code to a user's telephony device. The user must have previously registered the telephone number associated with the telephony device with either the identity verification system, or the party seeking identity verification. This allows the identity verification system to send the verification code to the user as part of a text message or via an automated audio telephone call. The user must then provide the received verification code back to the identity verification system or to the party seeking identity verification to complete the identity verification process. The two factors used in this scheme are the previously registered telephone number of the user's telephony device and the verification code sent to the user's telephony device by the identity verification system.

Unfortunately, such two factor authentication schemes are subject to fraud. Thus, parties who wish to exchange particularly sensitive data with a user have been seeking identity verification schemes that use three factors to accomplish identity verification. In particular, it would be preferable to use some form of biometric information as part of the authentication scheme, which further ensures that the party participating in the identity verification process is the correct party. Unfortunately, using three factors to accomplish identity verification can be difficult where the only way to communicate with a user is via the user's telephony device. Further, it is difficult to accomplish identity verification with an item of biometric information when the only way to communicate with the user is via the user's telephony device.

DETAILED DESCRIPTION

In the following description, references to a call, a telephone call, a media session or to a telephony communication are intended to cover both audio and video calls, regardless of the system that is used to conduct the calls. Also, references to a messaging service are intended to cover messaging services that allow the transmission and reception of Internet Protocol (IP) based messages, including but not limited to SMS or "text" messages and MMS messages delivered via a telephony service provider, messages from messaging platforms that are independent from a telephony services provider (e.g., WhatsApp, Facebook Messenger and the like), as well as the transmission and reception of audio or video files.

Figure 1:
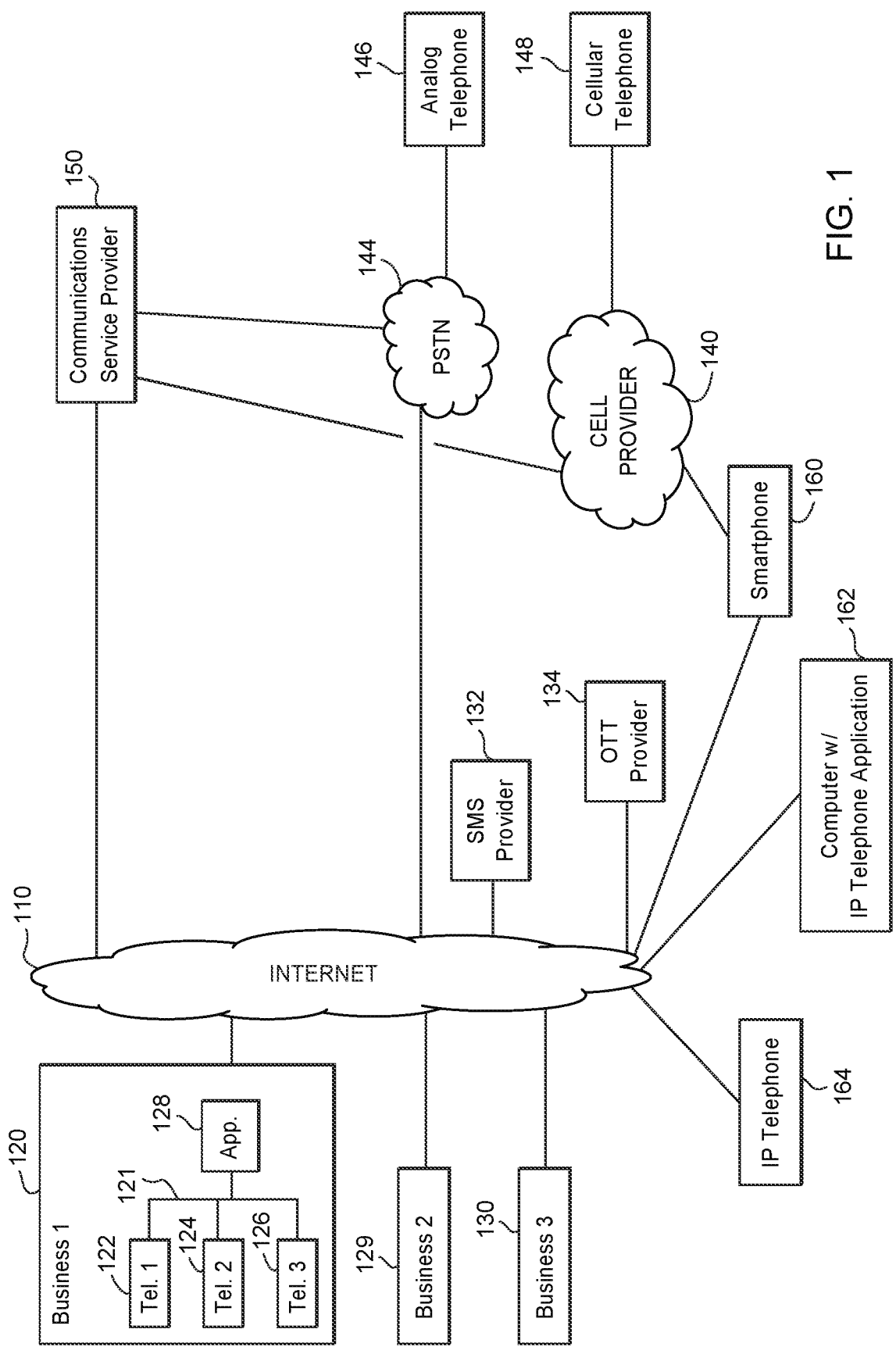
FIG. 1 is a block diagram illustrating various elements of a communication environment in which systems and methods embodying the invention can be performed.

FIG. 1 illustrates a communications environment 100 in which a communications service provider 150 embodying the invention could exist, and in which the communications service provider 150 could perform methods embodying the invention. As shown in FIG. 1, the communications service provider 150 is connected to the Internet 110, a publicly switched telephone network (PSTN) 144 and a cellular service provider 140. As a result, the communications service provider 150 can receive calls from customers that originate from the cellular service provider 140, the PSTN 144, or an alternate IP telephony service provider (not shown) accessible via the Internet 110. The communications service provider 150 then connects those calls to one or more businesses, or to individuals' telephony devices via the Internet 110. As will be explained in more detail below, the communications service provider 150 may also operate to transmit and receive messages, such as SMS, MMS and other text messages.

FIG. 1 shows that the communications environment 100 can include a first business 120 which is also connected to the Internet 110. The first business 120 includes a first telephony device 122, a second telephony device 124, and a third telephony device 126. The telephony devices 122, 124, 126 are connected to an internal data network 121, which is itself connected to the Internet 110. The communications environment also includes multiple other businesses, such as a second business 129 and a third business 130. The second business 129 and third business 130 could also include one or more telephony devices that can ultimately connect to the communications service provider 150 via the Internet 110 or via the PSTN 144 or cellular service provider 140.

FIG. 1 also illustrates that the communications environment 100 also includes a SMS messaging provider 132, and an IP Messaging Service (also referred to as an over the top (OTT) messaging provider) 134. The SMS message provider 132 and OTT messaging provider 134 act to coordinate the transmission of messages between individual telephony devices such as smartphones, as well as to and between IP telephony software applications running on computing devices. Some of the messaging providers 132/134 can deliver files, such as audio and video files, via the messaging channels they operate.

As shown in FIG. 1, customers can utilize various different telephony devices to communicate with the communications service provider 150. FIG. 1 shows an analog telephone 146 which is connected to the PSTN 144. A customer could use that analog telephone 146 to place a traditional audio call that is ultimately routed to the communications service provider 150. Likewise, the communications service provider could route audio calls to the analog telephone 146 via the PSTN 144.

FIG. 1 also illustrates that a customer could utilize a cellular telephone 148 that is connected to a cellular service provider 140 to communicate with the communications service provider 150. Another customer might utilize a smartphone 160 that is also connected to the cellular service provider 140 and to the Internet 110 to communicate with the communications service provider 150.

Some customers may use an Internet protocol (IP) telephone 164 which is connected to the Internet 110 to communicate with the communications service provider 150. Similarly, a customer could utilize a computer which is running an IP-based telephony software application 162 in order to establish communications with the communications service provider 150.

Figure 2:
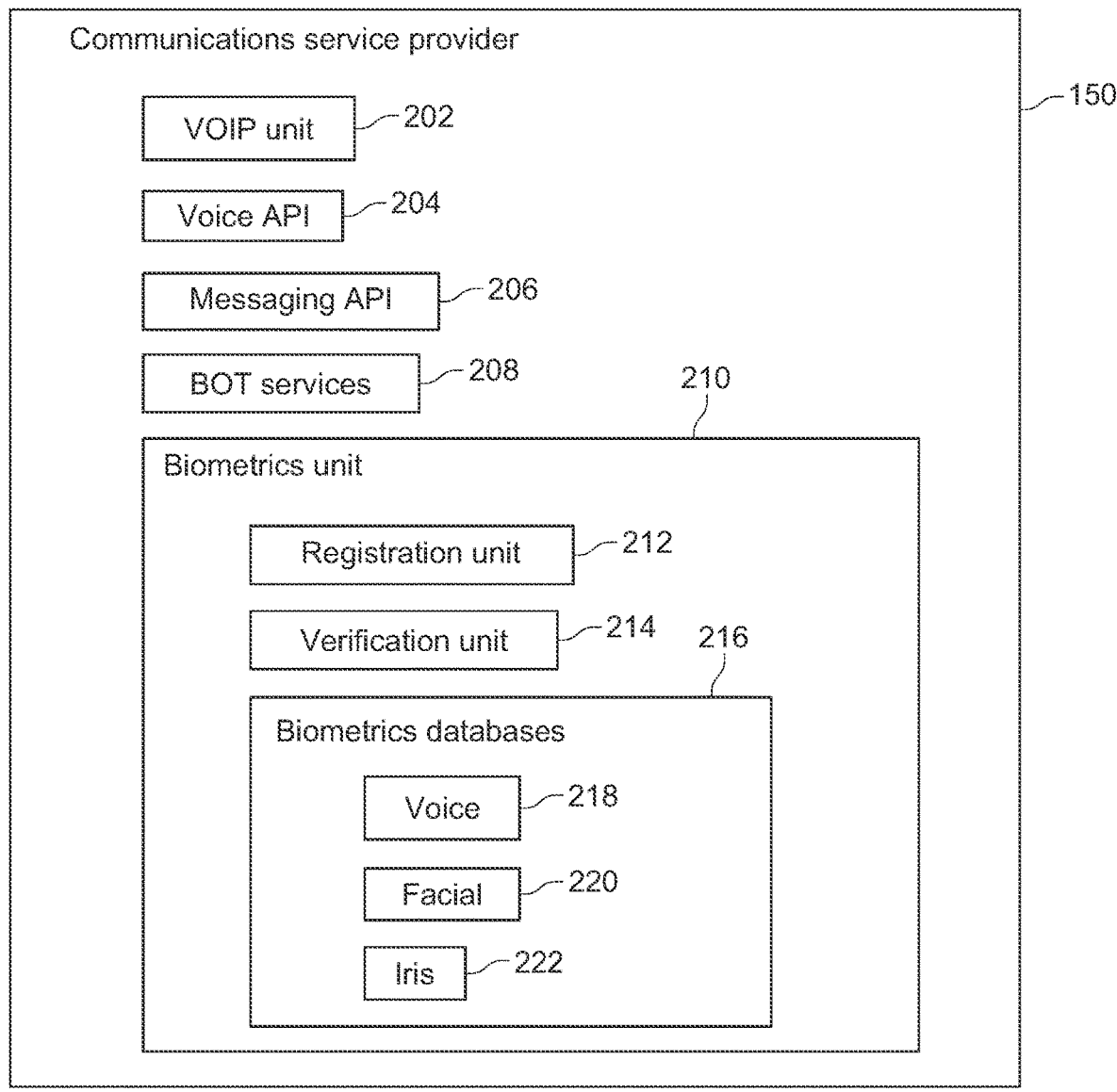
FIG. 2 is a block diagram illustrating various elements of a communications service provider embodying the invention or which can perform methods embodying the invention.

FIG. 2 illustrates elements of a communications service provider 150 which can embody the invention, and which can be configured to perform methods embodying the invention. The communications service provider 150 includes a Voice over Internet Protocol (VoIP) unit 202 which is configured to setup VoIP telephone calls. As mentioned above, those calls could be audio calls or video calls. Such audio and video calls could be established by the VoIP unit 202 to virtually any of the telephony devices illustrated in FIG. 1, as well as to an IP software application running on a computing device.

The communications service provider 150 also includes a voice application programming interface (API) unit 204. The voice API unit 204 allows third party computer systems to setup and conduct voice or video telephone calls through the communications service provider 150 using the communications service provider's VoIP unit 202. In other words, the voice API unit 204 allows for a separate computer server or computing device to interface with the communications service provider 150 to setup and conduct voice and/or video telephone calls.

The communications service provider 150 further includes a messaging API unit 206 which can be used to setup and conduct messaging sessions. The messaging sessions can include simple text messaging sessions as well sessions which are used to transmit audio and video. Further, the messaging API unit 206 could be used to transfer files containing text, audio or video via a messaging communications channel.

A third-party computer system or server can access the messaging API unit 206 to set up messaging sessions with various different user computing devices or telephony devices. In doing so, the messaging API unit 206 may act through internal messaging assets of the communications service provider 150 itself, or use the capabilities and assets of a separate messaging provider, such as the SMS messaging provider 132 and the OTT messaging provider 134 depicted in FIG. 1.

The communications service provider 150 further includes a BOT services unit 208. The BOT services unit 208 is a computer-based system which is used to communicate with users either via an audio communications channel or a messaging channel. The BOT services unit 208 is designed to emulate a customer service agent who can assist a customer in obtaining information or services. As such, the BOT services unit 208 is designed to interact with a customer to answer customer questions and to provide customers with answers and information in response to those questions. In some instances, the BOT services unit 208 would be designed to refer a customer to a live customer service agent if the BOT services unit 208 cannot satisfy a customer's request in an automated fashion.

The communications service provider 150 further includes a biometrics unit 210 which is designed to record individuals' biometric data, and thereafter verify the identity of those individuals based on the previously recorded biometric data. That biometric data can include voice biometric data, as well as imaging data such as an image of an individual's face or an image of an individual's iris.

The biometrics unit 210 includes a registration unit 212 which is designed to register or record an individual's biometric data within a biometrics database. The biometrics unit 210 further includes biometric databases 216 which can include a voice biometrics database 218, a facial recognition biometrics database 220 and an iris biometrics database 222. The biometrics databases 216 might also include additional databases, such as a database of fingerprint images and/or other databases containing alternate imaging data.

The registration unit 212 is configured to receive biometrics information from an individual, and to then to record that biometrics information into an appropriate biometrics database for later use in identifying the individual. In some instances, the biometrics data that is received from an individual is processed in some fashion before it is recorded into a biometric database. For example, an individual may provide voice biometric data in the form of spoken audio input, and the registration unit 212 may process that received spoken audio input to create a voiceprint for the individual. Details of how this is accomplished is described in more detail below.

The biometrics unit 210 further includes a verification unit 214 which is designed to verify the identity of an individual based on the individual's previously recorded biometric data. Typically, this involves the verification unit 214 receiving new biometrics information from an individual, and then attempting to match that newly received biometrics information to previously stored biometrics information for the individual that has been stored in one or more of the biometrics databases 216. Details of how this is accomplished is discussed in more detail below.

A communications service provider 150 embodying the invention could include a large number of elements in addition to those illustrated in FIG. 2. Likewise, a communications service provider 150 embodying the invention may not include all of the elements depicted in FIG. 2. As a result, FIG. 2 should no way be considered limiting of communications service providers embodying the invention.

Figure 3:
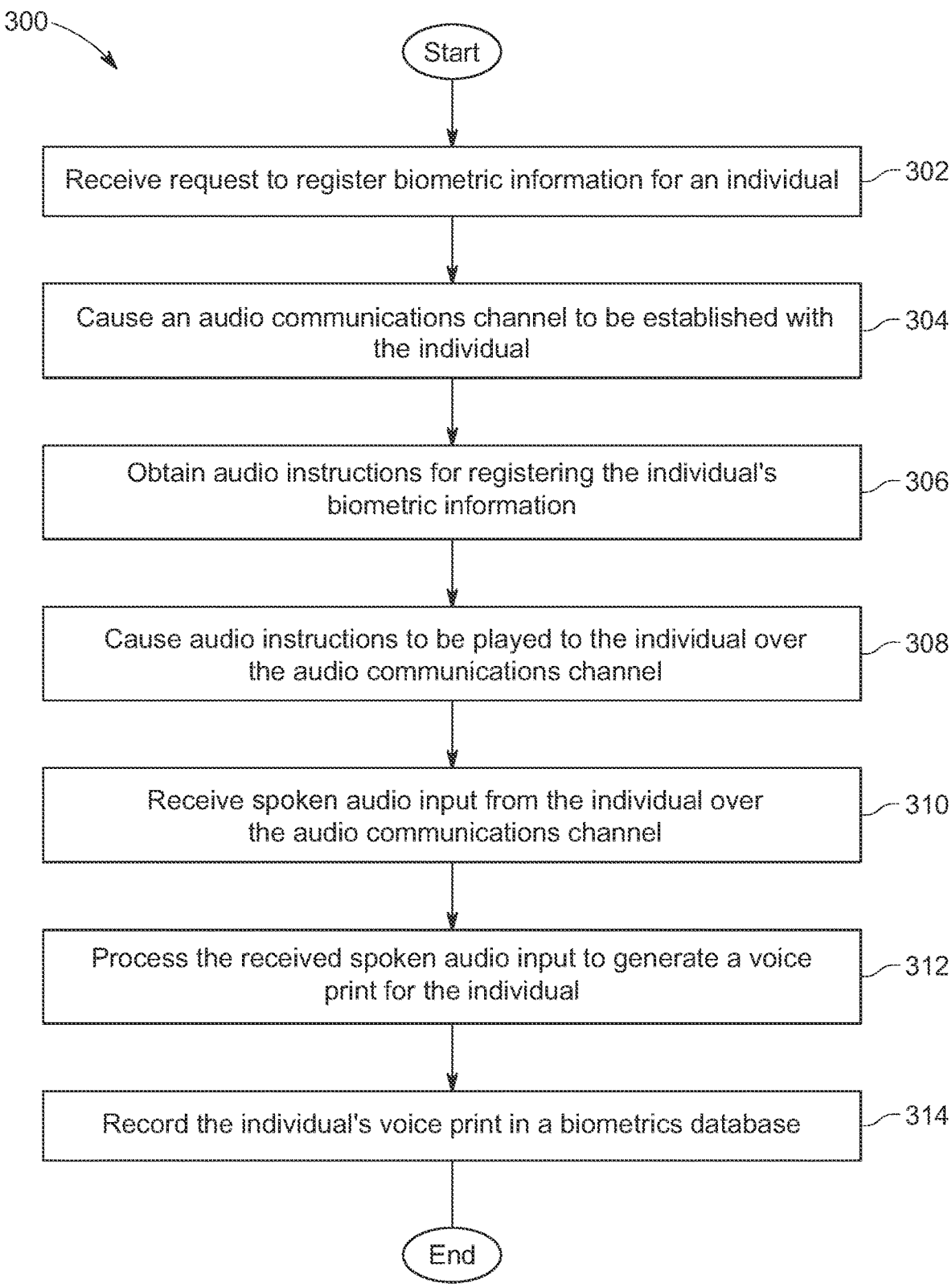
FIG. 3 is a flow diagram illustrating steps of a first method of registering an individual's voice biometric data using an audio communications channel.
Figure 4:
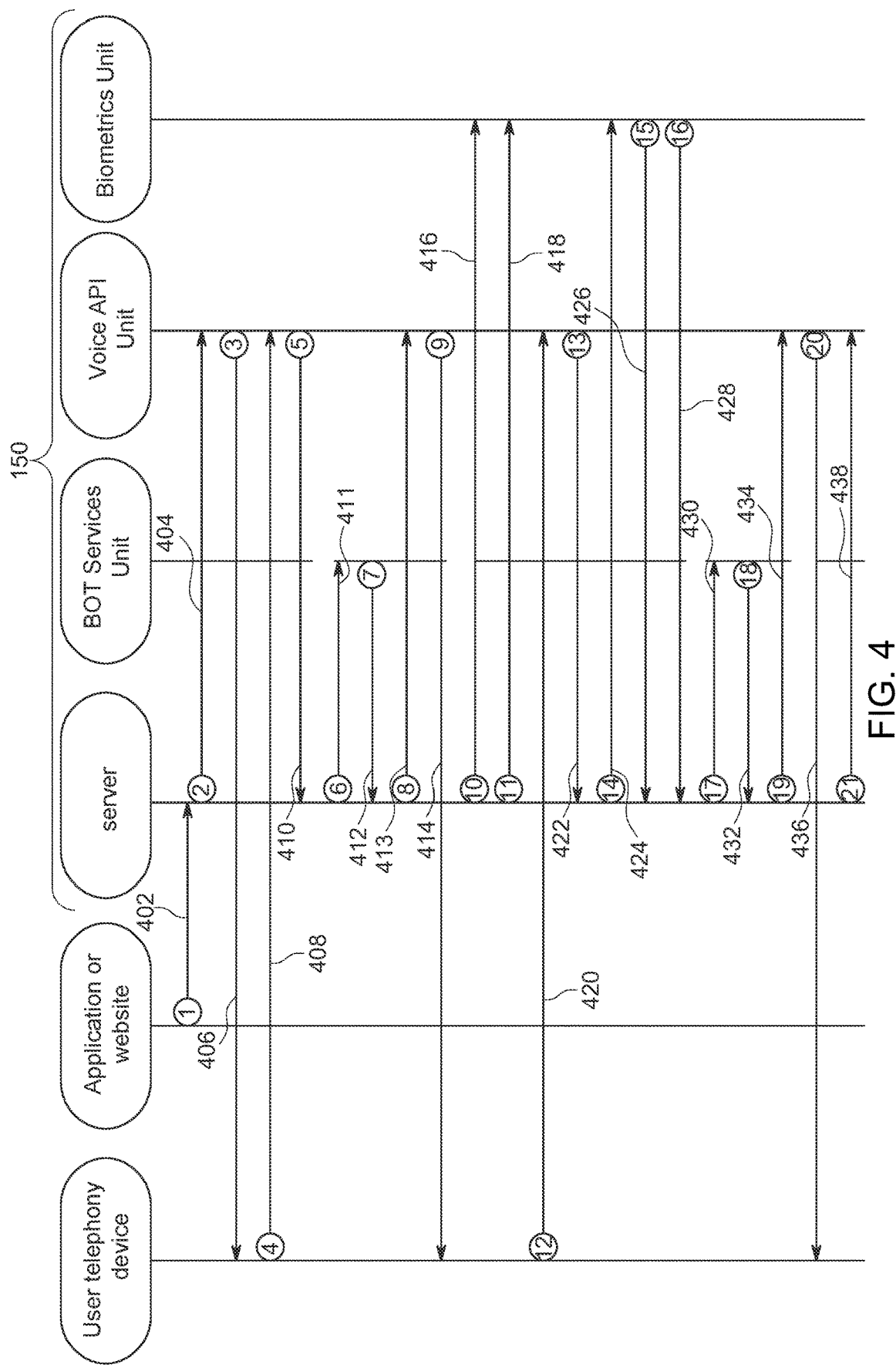
FIG. 4 is a signal diagram illustrating the sequence of messages and audio exchanges that would occur during performance of a method as illustrated in FIG. 3.

FIG. 3 is a flowchart illustrating steps of a first method of registering biometrics data for an individual using an audio communications channel. FIG. 4 is a corresponding signal diagram which illustrates how signals and audio can be exchanged between various elements of a communications environment in order to carry out the method illustrated in FIG. 3. FIGS. 3 and 4 will be discussed together to describe the first method of registering an individual's biometric data using an audio communications channel.

The method 300 begins and proceeds to step 302 where a registration unit 212 of a biometrics unit 210 would receive a request to register biometric information for an individual. In the signal diagram illustrated in FIG. 4, this would correspond to receiving a registration request 402 at a server of the communications service provider 150. The registration request could come from a variety of sources. In some instances, the registration request could come from a mobile application on a user's mobile communications device. In other instances, a user could be browsing a website and the user could select an item on the website to send a registration request to the biometrics unit 210 of the communications service provider 150. In still other instances, the request to register the individual's biometric information could be received via a messaging channel such as the SMS messaging provider 132, the OTT messaging provider 134, or the messaging API unit 206 of the communications service provider 150 itself.

Returning now to FIG. 3, the method would proceed to step 304 where the registration unit 212 of the biometrics unit 210 would cause an audio communications channel to be established with the individual. As shown in FIG. 4, this could involve the server of the communications service provider 150 sending a request to the voice API unit 204 asking for the voice API unit 204 to setup an audio telephone call with the individual's telephony device. This could require that the individual have already registered a telephone number for the individual's telephony device with the communications service provider 150. Alternatively, the telephone number of the individual's telephony device could be included in the registration request 402 received in step 302. In any event, the voice API unit 204 would send a call setup request 406 to the individual's telephony device, and the individual's telephony device would send a response 408 to the voice API unit 204, thereby establishing an audio communications channel between the individual and the registration unit 212. The voice API unit 204 would send a signal 410 to the server indicating that the audio communications channel had been established.

Returning now to FIG. 3, in step 306 the registration unit 212 would obtain or generate instructions for registering the individual's biometric data. The registration instructions are basically instructions which are to be sent to and showed and/or played to the individual via the audio communications channel that has been established. In some embodiments, the registration instructions would take the form of spoken instructions that can be played to the individual over the audio communications channel. The audio instructions could include a script that the individual is to speak in order to provide voice biometric data in the form of spoken audio input.

With reference to FIG. 4, step 306 could be accomplished by having the registration unit 212 send a request 411 to a BOT services unit 208 for a set of audio instructions which could be played to the individual via the audio communications channel. The BOT services unit 208 then sends a message 412 with the audio registration instructions back to the registration unit 212.

In step 308, the registration unit 212 causes the generated or obtained audio registration instructions to be played to the individual over the audio communications channel that has been established. As illustrated in FIG. 4, this could be accomplished by having the registration unit 212 send a message 413 with the audio registration instructions to the voice API unit 204. The voice API unit 204 would then send data 414 containing the audio registration instructions on to the individual's telephony device.

Returning now to FIG. 3, the method would then proceed to step 310 where the biometrics unit 210 would receive audio input from the individual over the audio communications channel.

As depicted in FIG. 4, this could involve a server of the communications service provider 150 sending messages 416, 418 instructing the registration unit 212 to setup a new biometrics registration for the individual. The individual would then speak a script according to the audio registration instructions that the individual received, and the spoken audio would be sent as data 420 to the voice API unit 204. The audio API unit 204 then sends the received audio data 422 to the server, and the server sends the received audio data 424 to the registration unit 212.

Returning to FIG. 3, the method would then proceed to step 312 where the spoken audio input received from the individual is processed by the registration unit 212 to generate a voice print for the individual. Turning to FIG. 4, this could include the registration unit 212 or the verification unit 214 sending a progress report 426 to the server, and then later sending a completion report 428 to the server.

Turning to FIG. 3, once the voice print for the individual has been generated it would then be recorded in a voice biometrics database, such as the voice biometrics database 218 depicted in FIG. 2.

Although not depicted in FIG. 3, once the voice print for the individual has been created, the server could notify the BOT services unit 208 that the registration has been accomplished. In FIG. 4, this corresponds to the server sending a registration complete signal 430 to the BOT services unit 208, and the BOT services unit 208 sending back an acknowledgment signal 432. Also, the server could cause an audio notification to be sent to the individual indicating that registration of the individual's voice biometric data is complete. This corresponds to the server sending a registration complete report 434 to the Voice API unit 204 and the Voice API unit 204 sending an audio notification 436 to the individual indicating that registration of the voice biometric data is complete. Finally, the server can send an instruction 438 to the voice API 204 indicating that the audio communications channel to the individual should be terminated.

To summarize, in the process described above a user requests that their voice biometrics data be recorded so that it can later be used to identify the individual. An audio communications channel is set up between a biometrics registration unit 212 and a telephony device used by the individual. Registration instructions are provided to the individual indicating that the individual is to speak a particular script in order to provide their voice biometric data. The individual then speaks that script over the audio communications channel. The registration unit 212 receives the individual's spoken audio input, processes the spoken audio input, and generates a voice print for the individual. The voice print for the individual is then recorded in a voice biometrics database 218.

Figure 5:
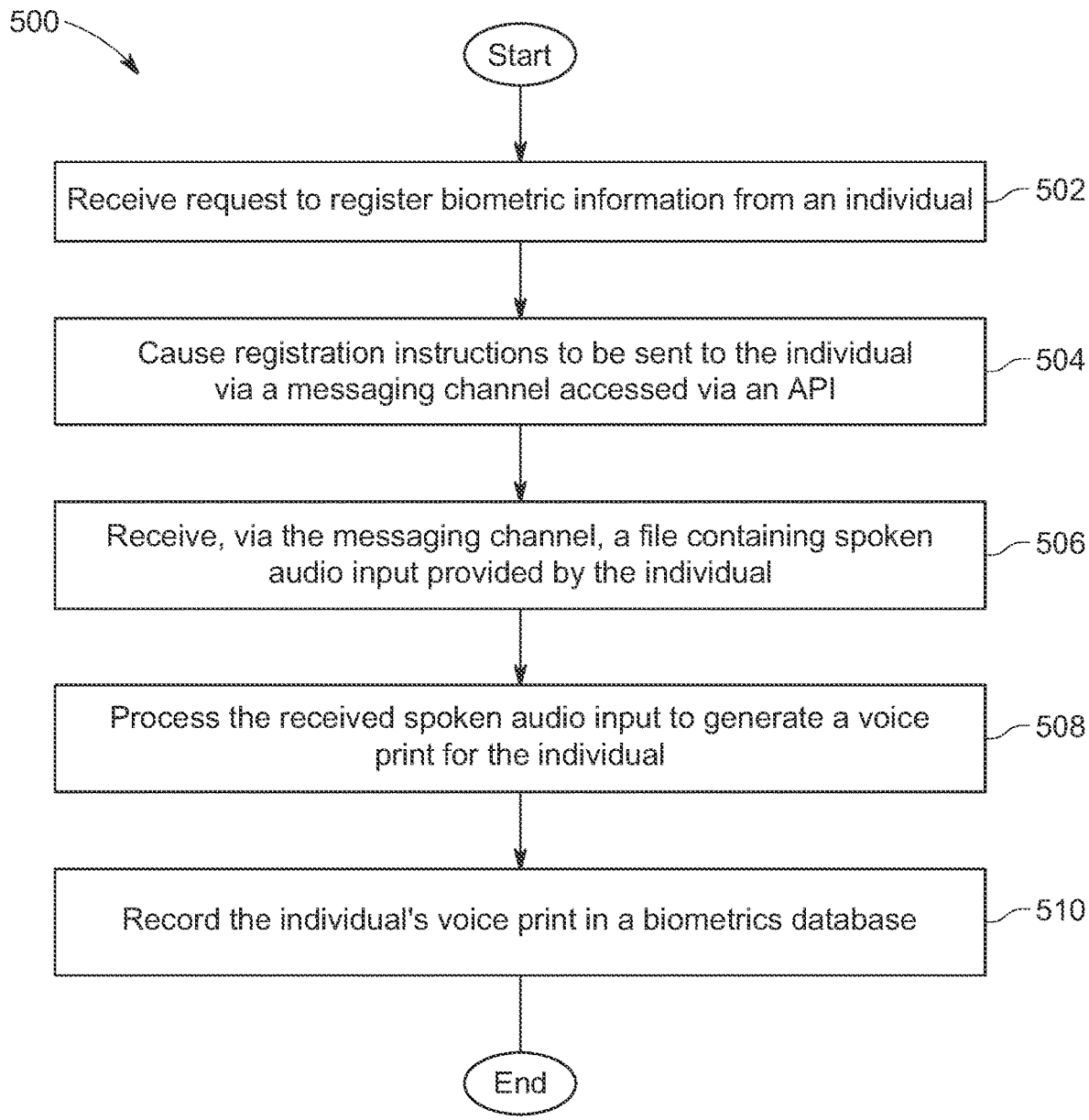
FIG. 5 is a flow diagram illustrating steps of a second method of registering an individual's voice biometric data using a messaging channel.
Figure 6:
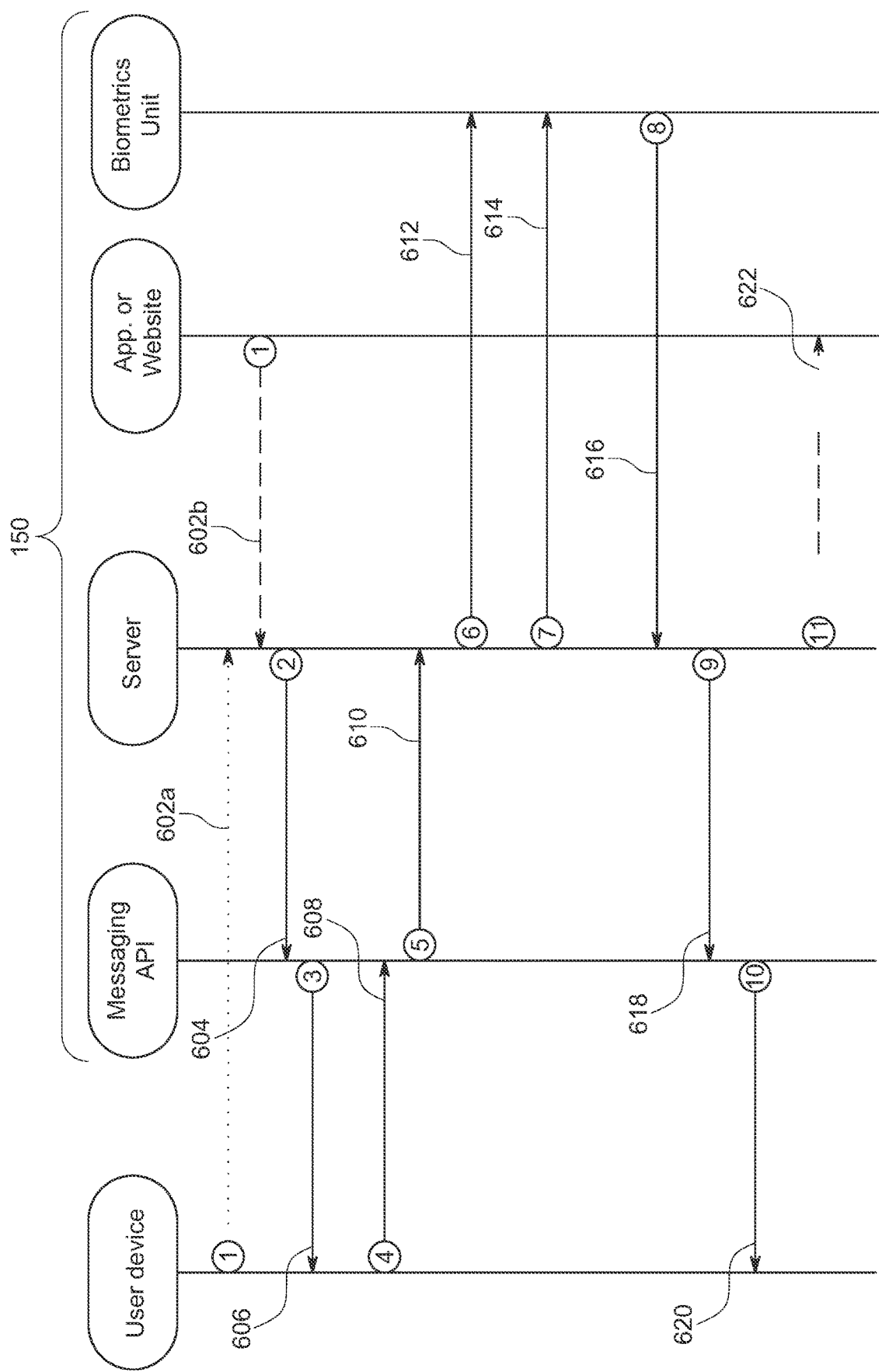
FIG. 6 is a signal diagram illustrating the sequence of messages that would occur during performance of a method as illustrated in FIG. 5.

FIG. 5 illustrates the steps of a second method of registering an individual's voice biometrics data. In this method, however, the individual's voice biometrics data is received via a messaging channel instead of an audio communications channel. FIG. 6 illustrates a signal flow diagram which illustrates how signals would pass between elements of a communications environment during performance of the method depicted in FIG. 5.

The method 500 begins and proceeds to step 502 where a server of a communications service provider 150 receives a request to register an individual's biometrics information. The server may or may not be part of a biometrics unit 210 of the communications service provider 150. As depicted in FIG. 6, a request 602a to register the individual's biometrics data could be received via a messaging channel. The registration request 602a could be received through a messaging API unit 206 of the communications service provider 150. Alternatively, the registration request message 602a could have been sent via a separate SMS messaging provider 132 or an OTT messaging provider 134, as depicted in FIG. 1.

In an alternate embodiment, a registration request message 602b could be received via a different signal path that does not involve a messaging service. For example, the registration request 602b could come from an application on a user's mobile computing device or from a website to which the individual has navigated via a browser. In still other instances, the individual could have a voice conversation with a customer service agent and the registration request 602b could be received from the customer service agent.

Returning to FIG. 5, the method would then proceed to step 504 where the registration unit 212 causes registration instructions to be generated and sent to the individual via a messaging channel. The registration instructions sent to the individual could include a script that the individual is to speak in order to provide voice biometric data. This script could include an identification number or a series of terms that the individual is to speak in the specified order when the individual provides spoken audio input. The instructions could be in the form of audio instructions, or the instructions could be in the form of text. As illustrated in FIG. 6, step 504 of this method could include a server of the communications service provider 150 generating the registration instructions and then sending the instructions to the individual via a messaging channel. For example, the server could send a message 604 with the registration instructions to a messaging API unit 206 of the communications service provider. The messaging API unit 206 then sends a message 606 with the registration instructions to the user. The messaging API Unit 206 could send the registration instructions to the individual via a separate messaging service that ultimately delivers the registration instructions to the individual.

In some embodiments, the registration instructions would be sent in the form of a text message that is directed to a telephone number which has previously been registered for the individual. As a result, the messaging API unit 206 could simply send a text message with the registration instructions to the individual's telephone number, which would likely result in the text message being received on an individual's mobile computing device, such as a smartphone. In other instances, the registration instructions could be audio instructions. In that instance, the audio instructions could be contained in an audio file, and the audio file could be delivered to the individual's telephony device via a messaging channel.

As illustrated in FIG. 5, the method would then proceed to step 506 where the registration unit 212 receives, via a messaging channel, a file containing spoken audio input provided by the individual. This means that the individual would follow the instructions the individual received, and the individual would actually speak a script provided in the registration instructions in order to create an audio file. The individual would then send the audio file back to the registration unit 212 via the messaging channel that was used to send the registration instructions to the individual. As shown in FIG. 6, this can include the individual causing the audio file to be sent as part of a message 608 that is sent to the messaging API unit 206. The messaging API unit 206 then sends a message 610 with the audio file on to the server of the communications service provider 150.

Next, in step 508 the registration unit 212 processes the received spoken audio input to generate a voice print for the individual. As depicted in FIG. 6, this could involve the server that received the audio file first sending a message 612 to the registration unit 212 to establish a new registration for the individual. The server could thereafter send a message 614 with the audio file to the registration unit 212. The registration unit 212 would then process the received audio input contained within the audio file in order to generate a voice print for the individual. Once complete, the registration unit 212 sends a registration complete message 616 to the server indicating that the voice print had been successfully created.

If the script provided to the individual in step 504 included an identification number or a series of terms that the individual was to speak in a specified order when providing spoken audio input, then the method could include an optional step of sending the individual's spoken audio input to a transcription unit. The transcription unit could be part of the communications service provider 150, or the transcription unit could be completely separate from the communications service provider 150. The transcription unit would return a text version of what the individual spoke. The registration unit 212 could then compare the transcription of what the individual spoke to the script provided to the individual to ensure that the individual spoke the identification number or series of terms in the correct order. If the individual failed to speak the identification number or series of terms in the correct order, then the registration of the individual's biometric data could fail.

As illustrated in FIG. 5, the method then proceeds to step 510, where the generated voiceprint is stored in a voice biometric database 216.

Although not depicted in FIG. 5, the method could further include sending a notification to the individual to indicate that the voice biometric data has been successfully registered. As illustrated in FIG. 6, this could include the server sending a registration complete message 618 to the messaging API 206, and the messaging API 206 sending a registration complete message 620 to the individual via a messaging channel. In an optional step, an additional communication 622 could be sent from the registration unit 212 to a third-party server to indicate that the individual's voice print registration had been completed. Further, if the request to register the individual's voice biometric data was received from a party other than the individual, a message 622 indicating that registration has been successfully completed could be sent to the party that originally requested registration of the voice biometric data.

Figure 7:
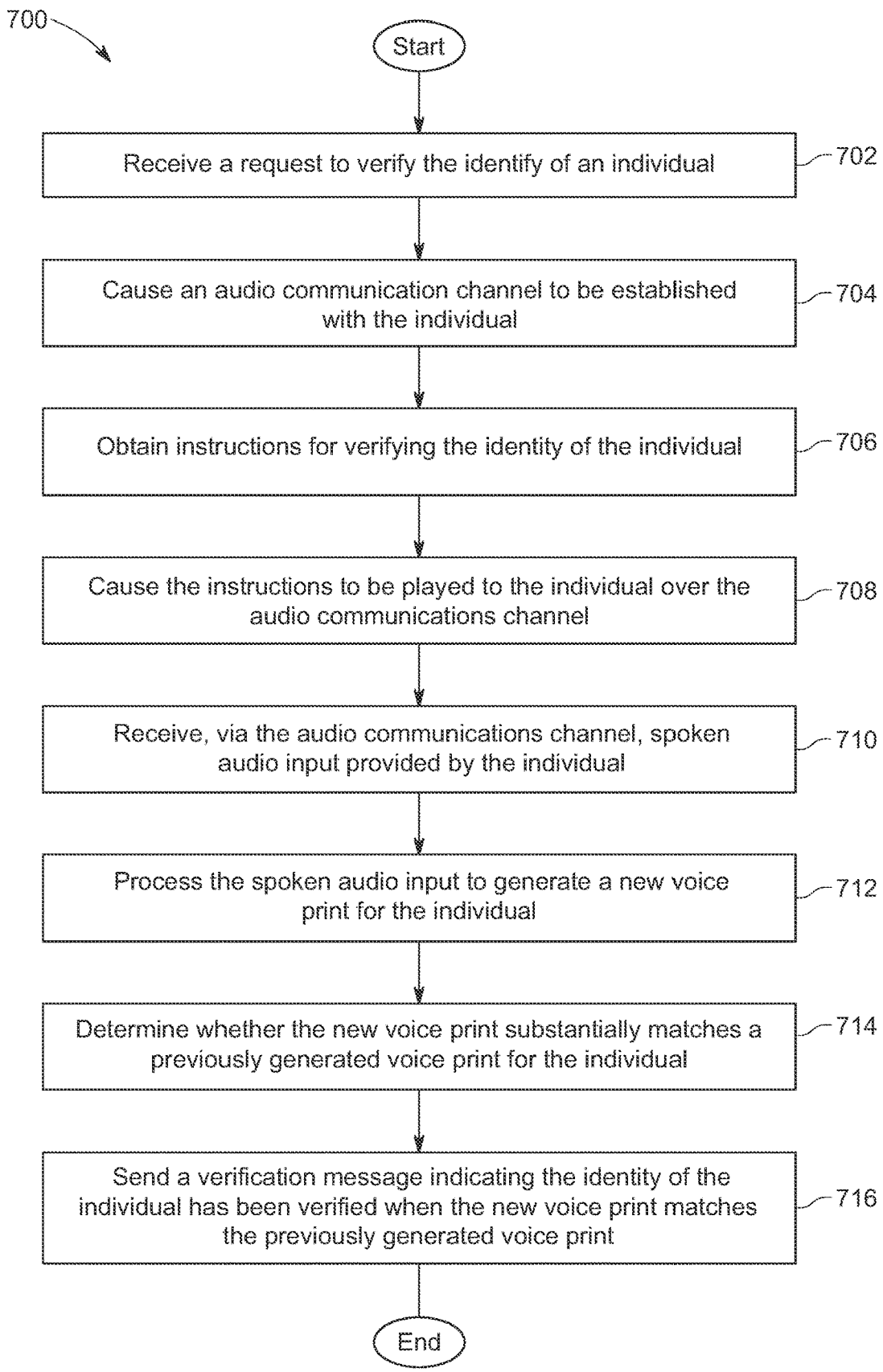
FIG. 7 is a flow diagram illustrating steps of a first method of verifying the identity of an individual using voice biometric data via an audio communications channel.
Figure 8:
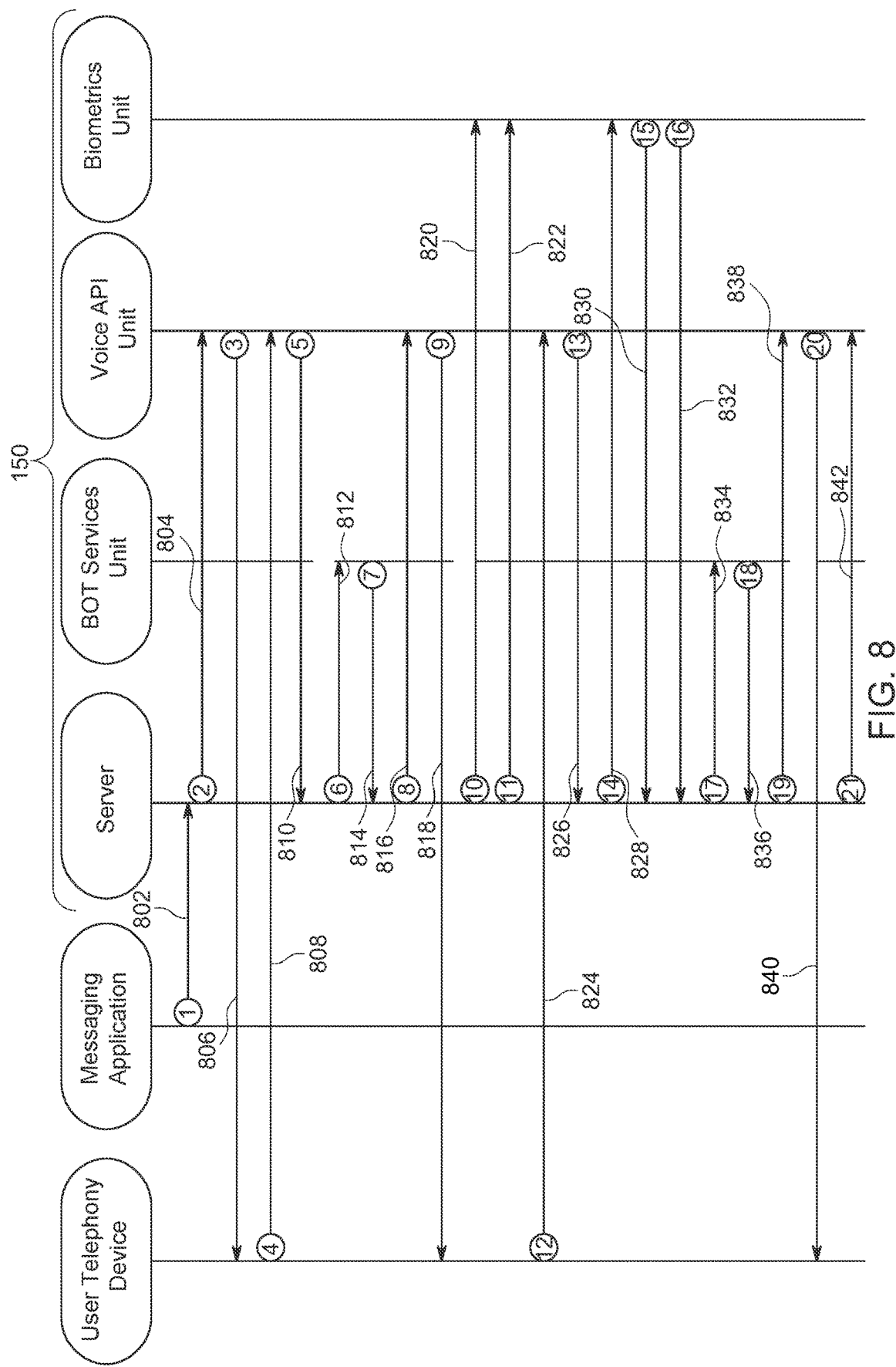
FIG. 8 is a signal diagram illustrating the sequence of messages and audio exchanges that would occur during performance of a method as illustrated in FIG. 7.

FIG. 7 illustrates steps of a first method for verifying the identity of an individual using voice biometric data. In this method, the verification is accomplished using an audio communications channel. FIG. 8 is a corresponding signal diagram illustrating how elements of a communications system would exchange signals and audio in order to accomplish the method depicted in FIG. 7.

The method 700 begins and proceeds to step 702 where a server of the communications service provider 150 receives a request to verify the identity of an individual using voice biometric data. This request could be received via an application on a user's mobile computing device, from a website a user is accessing via a web browser or perhaps as an identity verification request contained in a message received via a messaging channel. The server could be part of a verification unit 214 of a biometrics unit 210 of a communications service provider 150. As depicted in FIG. 8, step 702 could be accomplished by a server of the communications service provider 150 receiving an identification request 802 from some source.

The method then proceeds to step 704 where an audio communications channel is established with the individual. Typically, this would involve establishing an audio communications channel to a telephony device possessed or used by the individual. The telephony device could, for example, be a mobile communications device possessed by the individual. The audio communications channel could be established by setting up an audio or video call to a telephone number associated with the individual. In some instances, the individual would need to have previously registered the telephone number used to set up the audio communications channel. In other instances, the telephone number could be provided in the identity verification request. Also, the audio communications channel could be setup with the individual via some alternate type of telephony device that the individual uses, such as a telephony software application on a mobile computing device or a desktop or laptop computer.

As depicted in FIG. 8, step 704 could be accomplished by the server of the verification unit 214 sending a request 804 to a voice API unit 204 of the communications server provider 150 asking that an audio telephone call be established to a telephony device possessed by the individual. The voice API unit 204 then sends a call setup request 806 to the individual's telephony device. The individual's telephony device then sends an acknowledgment message 808 back to the voice API unit 204 and the audio communications channel to the individual will have been established. At this point, the voice API unit 204 could also send an acknowledgment message 810 back to the server to indicate the audio communications channel has been established.

Returning to FIG. 7, the method proceeds to step 706 where the verification unit 214 obtains instructions for verifying the identity of the individual from a BOT services unit 208. As depicted in FIG. 8, this can include the server of the verification unit 214 sending a request 812 to the BOT services unit 208 requesting identity verification instructions. The BOT services unit 208 would then send verification instructions 814 for verifying the identity of the individual back to the verification unit 214.

Returning to FIG. 7, The method then proceeds to step 708 where instructions for verifying the identity of the individual are sent to the individual via the audio communications channel. As illustrated in FIG. 8, this could involve the server of the verification unit 214 sending a message 816 with the verification instructions obtained from the BOT services unit 208 to the voice API unit 204. The voice API unit 204 would then send the audio instructions to the individual via data communications 818 passing over the audio communications channel. Typically, this would involve simply playing audio verification instructions to the individual over the audio communications channel. In alternate embodiments, a textual version of the verification instructions may be sent to the individual's telephony device over the audio communications channel, and the textual verification instructions could be displayed on the user's telephony device.

At this point, the server of the verification unit 214 may send messages 820, 822 to the biometrics unit 210 to inform the biometrics unit that it will soon receive audio input from an individual as part of an identity verification request. The messages 820, 822 could include information about the individual and information about how the individual will contact the biometrics unit 210 to provide spoken audio input as part of the verification request. This information could also include information about what the individual is expected to say as a result of the verification instructions received from the BOT services unit 208.

Returning to FIG. 7, the method then proceeds to step 710 where spoken audio input provided by the individual is received. As illustrated in FIG. 8, this could be accomplished by an audio stream 824 being sent over the audio communications channel to the voice API unit 204. The voice API unit 204 then sends that audio 826 back to the server. The server then sends a signal 828 with the audio stream to the verification unit 214 of the biometrics unit 210. The spoken audio input provided by the individual typically would be the individual speaking a script which was included in the verification instructions sent to the individual in step 708.

As illustrated in FIG. 7, the method then proceeds to step 712 where the spoken audio input provided by the user is processed in order to generate a new voice print for the individual. In step 714, the newly created voice print is compared to a previously generated voice print for the individual which was stored in a voice biometrics database 218 to determine whether the new voice print substantially matches a previously recorded voice print. If so, the verification unit 214 would verify the identity of the individual. While the verification unit is generating and comparing the voice prints, the biometrics unit could send a progress message 830 back to the server. When the process is complete, the biometrics unit sends a verification report message 832 to the server indicating whether the individual's identity has been verified.

When the server receives the verification report message 832, the server can send a verification report message 834 to with the BOT services unit 208, which then sends an acknowledgement message 836 back to the server.

The method then proceeds to step 716 where a verification message indicating whether the identity of the individual has been verified would be sent to the individual over the audio communications channel. As illustrated in FIG. 8, this can include the server sending an audio message 838 indicating that verification has been accomplished to the voice API unit 204. The voice API unit 204 then sends the audio message 840 to the individual over the audio communications channel. At that point, the server would send a call termination message 842 to the voice API unit 204 indicating that the audio communications channel is no longer needed and the voice API unit 204 would close the audio communications channel.

In some embodiments, once the identity of the individual has been verified, the message could also be sent to a third party to indicate that the identity of the individual has been verified.

Figure 9:
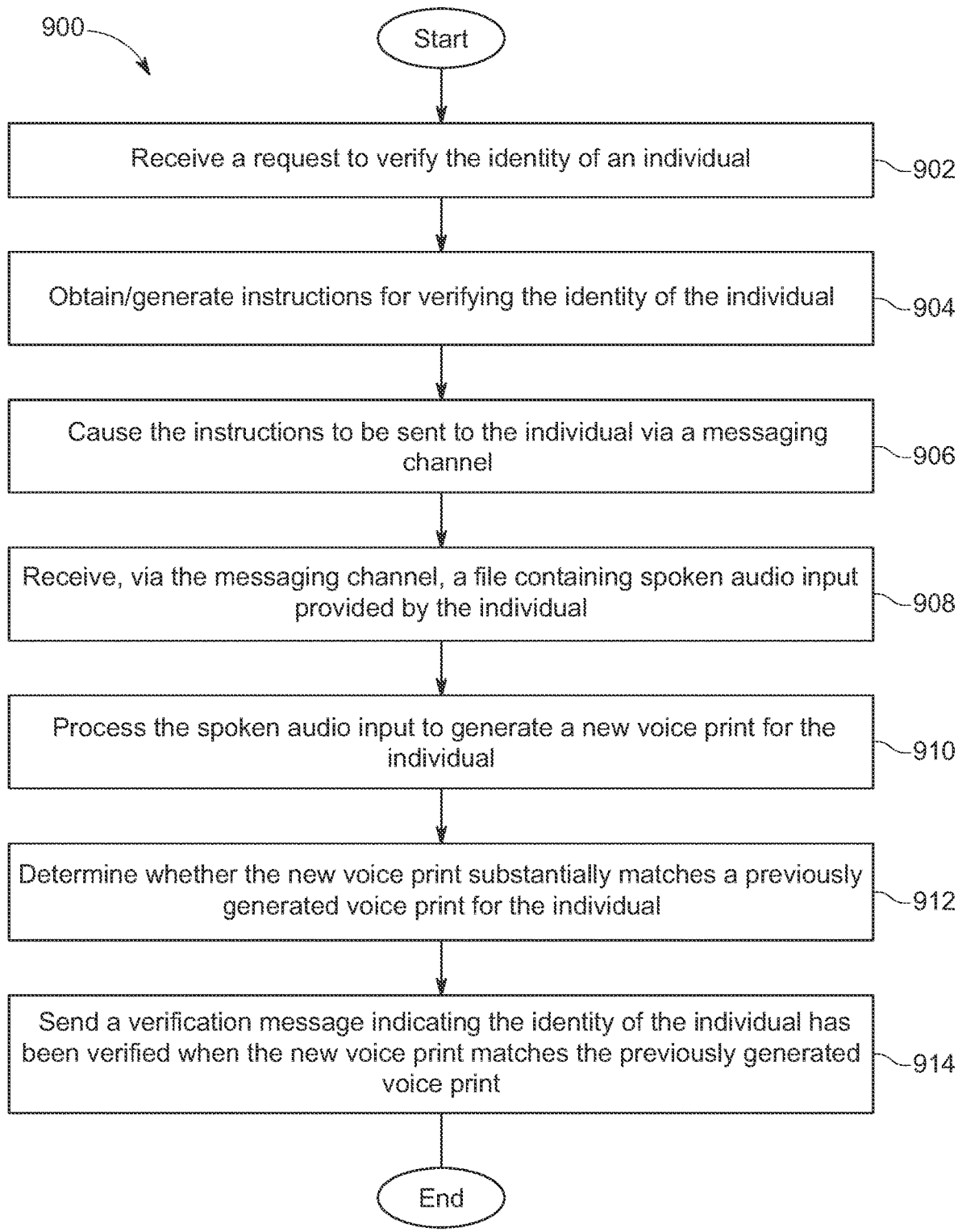
FIG. 9 is a flow diagram illustrating steps of a second method of verifying the identity of an individual using voice biometric data via a messaging channel.

FIG. 9 illustrates the steps of the second method of verifying the identity of an individual using voice biometric data. In this second method, a messaging communications channel is used instead of the audio communications channel discussed above.

Figure 10:
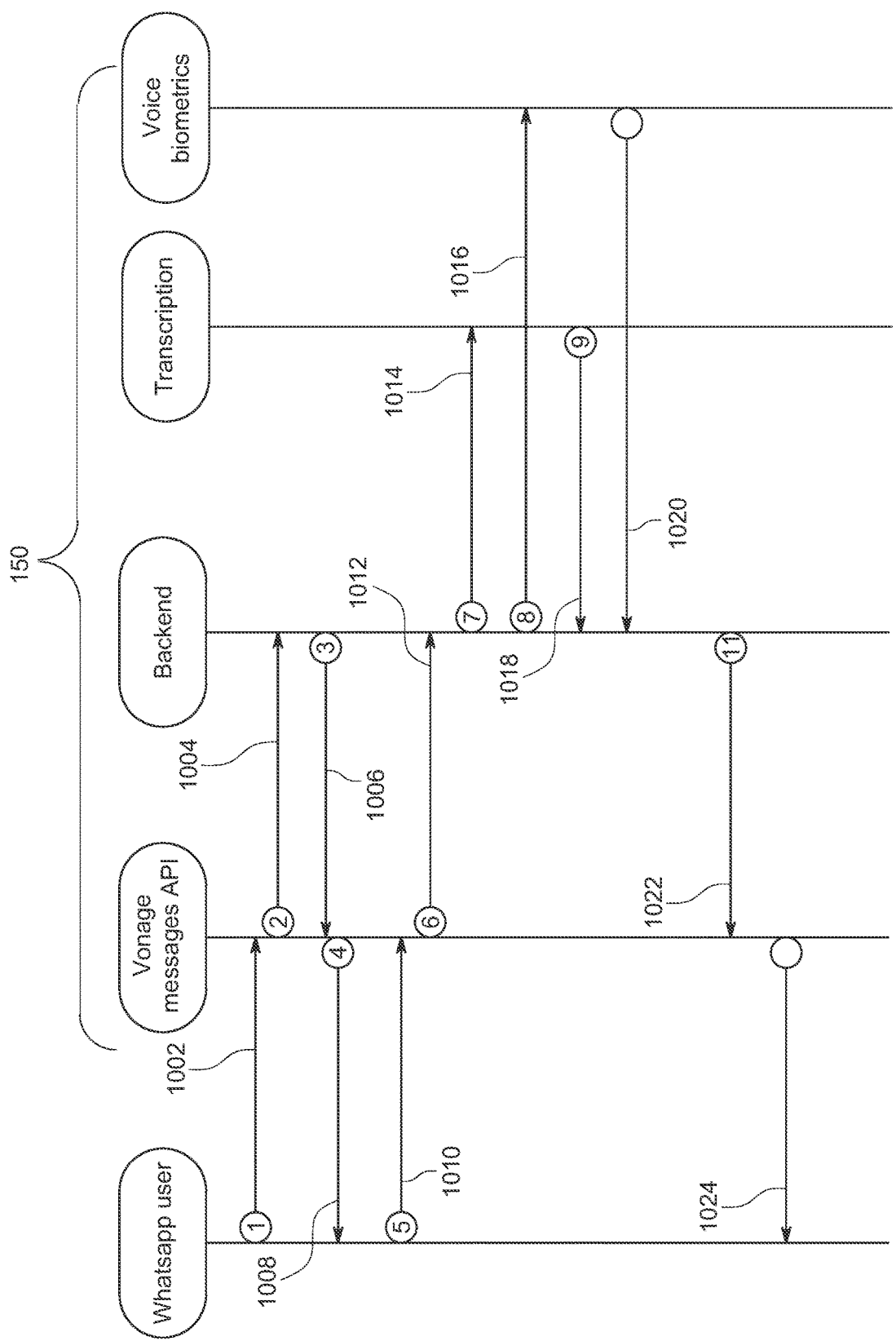
FIG. 10 is a signal diagram illustrating the sequence of messages that would occur during performance of a method as illustrated in FIG. 9.

The method 900 would begin and proceed to step 902 where a request to authenticate the identity of an individual is received. With reference to FIG. 10, this could include a user sending a text message with a verification request 1002 to a messaging API unit 206 of the communications service provider 150. The messaging API unit 206 then sends a similar verification request 1004 on to a server of the communications service provider 150. Alternatively, the verification request could be received from a third party (i.e., a bank, a call center or the like) that desires to authenticate the identity of the individual. In such a scenario, the verification request 1002 would originate from said third party and be relayed to the server as described above. The server may or may not be part of the verification unit 214.

The method then proceeds to step 904 where the server generates instructions for verifying the identity of the individual. The instructions can include a random series of numbers or other terms which form a script which the individual must speak, in the correct order, in order for the individual's identity to be verified. The method then proceeds to step 906 where the server sends the generated script and instructions for verification to the individual via a messaging channel. As illustrated in FIG. 10, this could be accomplished by the server generating the verification script and sending a message 1006 with that verification script to the individual as a text message. Alternatively, the script could be audio recording describing the terms which must be spoken in a particular sequence, and the audio could be encoded in an audio file. Either way, the verification script 1006 in the form of a text message or an audio file is sent from the server to the messaging API unit 206. The messaging API unit 206 then sends verification script 1008 in the form of text message or audio file on the individual via a messaging channel.

Returning to FIG. 9, the method then proceeds to step 908 where the server receives an audio file from the individual, via the messaging channel, where the audio file contains the individual's spoken audio input. This means that the individual would create an audio recording of the individual speaking the verification script which has been provided, and the individual would then send a message 1010 with that audio file back to the messaging API unit 206. The messaging API unit 206 then sends a message 1012 to server forwarding the audio file received from the individual.

Returning to FIG. 9, the method proceeds to step 910 where the verification unit 214 processes the spoken audio input in the received audio file in order to generate a new voice print for the individual. Next, in step 912, the verification unit 214 determines if the new voice print substantially matches a previously generated voice print for the individual which has been stored in a voice biometrics database 218. With reference to FIG. 10, the server sends a verification request message 1016 to the verification unit 214 of a biometrics unit 210. The verification request message 1016 would include the audio provided by the individual. The verification request message could also include the verification script that was originally sent to the individual. The verification unit 214 then generate a new voice print for the individual, compares it to a previously generated voice print for the individual and then sends a verification report message 1020 back to the server to indicate whether the individual's identity has been verified.

In an optional step, the server may send a transcription request message 1014 to a transcription unit which could be part of the communications services provider 150 or which could be completely separate. The transcription request message 1014 would include the audio provided by the individual. The transcription unit would transcribe the spoken audio input provided by the individual and send a transcription report message 1018 back to the server. The server could then determine whether the user had spoken the terms in the verification script in the correct sequence. This provides an additional check to ensure that the spoken audio input provided by the individual is in response to this particular identity verification request.

Returning to FIG. 9, the method then proceeds to step 914 where a message indicating that the individual's identity has been verified is sent back to the individual if the new generated voice print matches the previously recorded voice print for the individual. Verification may also hinge on whether the user spoke the terms or numbers in the verification script in the correct order. With reference to FIG. 10, this can include the server sending a verification report message 1022 to the messaging API unit 206, and the messaging API unit 206 sending a similar verification report message 1024 on to the individual via a messaging channel.

In some embodiments, if the user's identity is successfully verified, the verification unit 214 may send a message to a third-party server or other entity indicating that the individual's identity has been successfully confirmed.

The foregoing methods involved recording voice biometric information for an individual, and then later using the recorded voice biometric data to verify the identity of the individual. In alternate methods embodying the invention, image biometric data could be recorded for an individual, and the image biometric data could later be used to verify the identity of the individual.

For example, an image of an individual's face or iris could be recorded in a biometric database using methods similar to those discussed above in connection with FIGS. 3-6. An individual could obtain an image of the individual's face or eye using a camera of the user's telephony device, and a file containing that image could be sent to the registration unit 212 of a biometrics unit 210 using a messaging channel. Later, when it is necessary to verify the individual's identity the individual could provide a newly taken image of the individual's face or iris and the newly provided image could be sent to the verification unit 214 via a messaging channel. The verification unit could then compare the newly generated image to the previously recorded image to verify the individual's identity. Additional security measures could be implemented to ensure that the newly provided images are being generated at the time that the identity verification request is submitted.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object-oriented programming language, such as JavaScript, Java®, Swift or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 11:
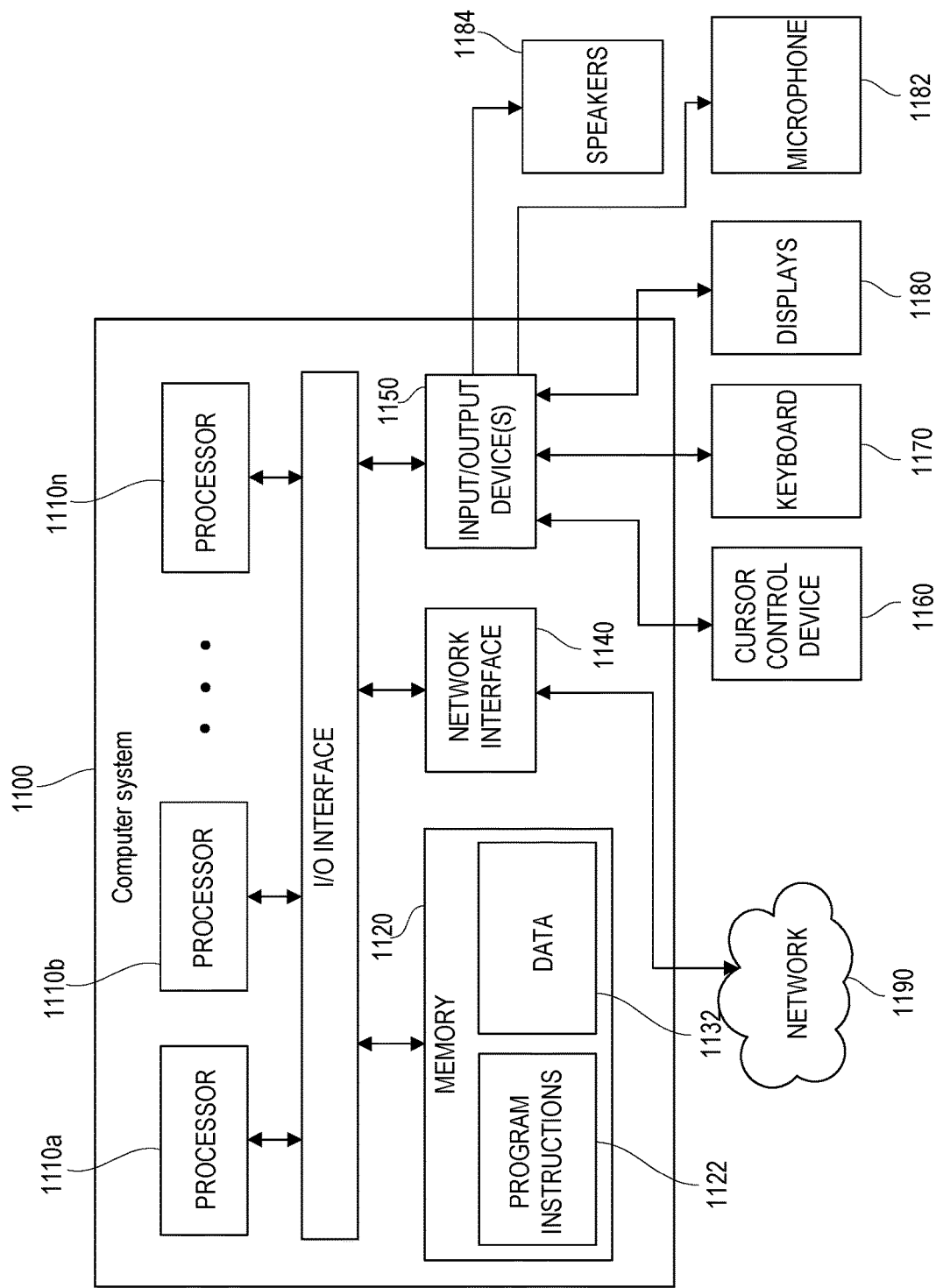
FIG. 11 is a diagram of a computer system that could be configured as an apparatus embodying the invention or which could be configured to perform methods embodying the invention.

FIG. 11 depicts a computer system 1100 that can be utilized in various embodiments of the present invention to implement the invention according to one or more embodiments. The various embodiments as described herein may be executed on one or more computer systems, which may interact with various other devices. One such computer system is the computer system 1100 illustrated in FIG. 11. The computer system 1100 may be configured to implement the methods described above. The computer system 1100 may be used to implement any other system, device, element, functionality or method of the above-described embodiments. In the illustrated embodiments, the computer system 1100 may be configured to implement the disclosed methods as processor-executable executable program instructions 1122 (e.g., program instructions executable by processor(s) 1110) in various embodiments.

In the illustrated embodiment, computer system 1100 includes one or more processors 1110a-1110n coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, display(s) 1180, microphone 1182 and speakers 1184. In various embodiments, any of the components may be utilized by the system to receive user input described above. In various embodiments, a user interface may be generated and displayed on display 1180. In some cases, it is contemplated that embodiments may be implemented using a single instance of computer system 1100, while in other embodiments multiple such systems, or multiple nodes making up computer system 1100, may be configured to host different portions or instances of various embodiments. For example, in one embodiment some elements may be implemented via one or more nodes of computer system 1100 that are distinct from those nodes implementing other elements. In another example, multiple nodes may implement computer system 1100 in a distributed manner.

In different embodiments, the computer system 1100 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs). In multiprocessor systems, each of processors 1110 may commonly, but not necessarily, implement the same ISA.

System memory 1120 may be configured to store program instructions 1122 and/or data 1132 accessible by processor 1110. In various embodiments, system memory 1120 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1120. In other embodiments, program instructions and/or data may be received, sent or stored upon different types of computer-accessible media or on similar media separate from system memory 1120 or computer system 1100.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network (e.g., network 1190), such as one or more external systems or between nodes of computer system 1100. In various embodiments, network 1190 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

In some embodiments, the illustrated computer system may implement any of the operations and methods described above, such as the methods illustrated by the flowcharts of FIGS. 3, 5, 7 and 9, and as depicted in greater detail in the signal flow diagrams of FIGS. 4, 6, 8 and 10. In other embodiments, different elements and data may be included.

Those skilled in the art will appreciate that the computer system 1100 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1100 may also be connected to other devices that are not illustrated, or instead ay operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by a biometrics unit for verifying the identity of an individual based on voice biometric information, comprising:
   receiving at the biometrics unit a request to verify the identity of an individual using biometric information, wherein the request includes an identity of a remote server that is to be notified of the result of the identity verification process;
   causing a communications channel to be established between the biometrics unit and a telephony device used by the individual;
   obtaining verification instructions for verifying the identity of the individual using voice biometric information, wherein the verification instructions include a script that the individual is to speak;
   causing the obtained verification instructions to be conveyed to the individual over the communications channel;
   receiving spoken audio input provided by the individual, where the spoken audio input is received over the communications channel, and where the spoken audio input is expected to include the individual speaking the script in the verification instructions;
   processing the received spoken audio input to generate a new voice print for the individual;
   determining whether the generated new voice print substantially matches a previously generated voice print for the individual that is stored in a voice biometrics database; and
   sending an identity verification message to the individual via the communications channel and to the remote server indicating that the identity of the individual has been verified when the generated new voice print substantially matches the previously generated voice print.

2. The method of claim 1, wherein the script in the verification instructions includes a plurality of terms arranged in a particular order, and wherein the method further comprises:
   examining the received spoken audio input to determine whether the individual spoke the plurality of terms in the particular order; and wherein the confirmation message is sent to the individual only if the examining step determines that the individual spoke the plurality of terms in the particular order.

3. The method of claim 2, wherein the step of examining the received spoken audio input comprises:
using the received spoken audio input to prepare a transcript of what the individual spoke in the received audio input; and
comparing the transcript to the script in the verification instructions to determine whether the individual spoke the plurality of terms in the particular order.

4. The method of claim 1, wherein the step of causing a communications channel to be established between the biometrics unit and a telephony device used by the individual comprises establishing an audio communications channel between the biometrics unit and the telephony device used by the individual.

5. The method of claim 4, wherein the step of causing the obtained verification instructions to be conveyed to the individual over the communications channel comprises playing audio verification instructions to the individual over the audio communications channel.

6. The method of claim 1, wherein the step of causing a communications channel to be established between the biometrics unit and a telephony device used by the individual comprises establishing a text-based messaging channel between the biometrics unit and the telephony device used by the individual.

7. The method of claim 6, wherein the step of causing the obtained verification instructions to be conveyed to the individual comprises sending the verification instructions to the individual as part of a message that is sent to the individual's telephony device via the text-based messaging channel.

8. The method of claim 7, wherein the step of receiving spoken audio input from the individual comprises receiving, via the text-based messaging channel, a file containing the spoken audio input.

9. The method of claim 7, wherein obtaining verification instructions comprises receiving text-based instructions, and wherein causing the obtained verification instructions to be sent to the individual comprises sending a text-based message that includes the verification instructions to the individual via the text-based messaging channel.

10. The method of claim 7, wherein obtaining verification instructions comprises receiving audio verification instructions, and wherein causing the verification instructions to be sent to the individual comprises sending a file containing the audio verification instructions to the individual via the text-based messaging channel.

11. The method of claim 1, wherein the request to verify the identity of an individual is received from a first server controlled by a first entity, and wherein the remote server that is to be notified of the result of the identity verification process is a second server controlled by a second entity that is different from the first entity.

12. A system for verifying the identity of an individual based on voice biometric information, comprising:
means for receiving, at a biometrics unit, a request to verify the identity of an individual using biometric information, wherein the request includes an identity of a remote server that is to be notified of the result of the identity verification process;
means for causing a communications channel to be established between the biometrics unit and a telephony device used by the individual;
means for obtaining verification instructions for verifying the identity of the individual using voice biometric information, wherein the verification instructions include a script that the individual is to speak;
means for causing the obtained verification instructions to be conveyed to the individual over the communications channel;
means for receiving spoken audio input provided by the individual, where the spoken audio input is received over the communications channel, and where the spoken audio input is expected to include the individual speaking the script in the verification instructions;
means for processing the received spoken audio input to generate a new voice print for the individual;
means for determining whether the generated new voice print substantially matches a previously generated voice print for the individual that is stored in a voice biometrics database; and
means for sending an identity verification message to the individual via the communications channel and to the remote server indicating that the identity of the individual has been verified when the generated new voice print substantially matches the previously generated voice print.

13. A system for verifying the identity of an individual based on voice biometric information, comprising:
a memory; and
at least one processor, wherein the at least one processor is configured to perform a method comprising the steps of:
receiving, at a biometrics unit, a request to verify the identity of an individual using biometric information, wherein the request includes an identity of a remote server that is to be notified of the result of the identity verification process;
causing a communications channel to be established between the biometrics unit and a telephony device used by the individual;
obtaining verification instructions for verifying the identity of the individual using voice biometric information, wherein the verification instructions include a script that the individual is to speak;
causing the obtained verification instructions to be conveyed to the individual over the communications channel;
receiving spoken audio input provided by the individual, where the spoken audio input is received over the communications channel, and where the spoken audio input is expected to include the individual speaking the script in the verification instructions;
processing the received spoken audio input to generate a new voice print for the individual;
determining whether the generated new voice print substantially matches a previously generated voice print for the individual that is stored in a voice biometrics database; and
sending an identity verification message to the individual via the communications channel and to the remote server indicating that the identity of the individual has been verified when the generated new voice print substantially matches the previously generated voice print.

14. The system of claim 13, wherein the script in the verification instructions includes a plurality of terms arranged in a particular order, and wherein the method performed by the at least one processor further comprises:

examining the received spoken audio input to determine whether the individual spoke the plurality of terms in the particular order; and wherein the confirmation message is sent to the individual only if the examining step determines that the individual spoke the plurality of terms in the particular order.

15. The system of claim 14, wherein the step of examining the received spoken audio input comprises:

using the received spoken audio input to prepare a transcript of what the individual spoke in the received audio input; and comparing the transcript to the script in the verification instructions to determine whether the individual spoke the plurality of terms in the particular order.

16. The system of claim 13, wherein the step of causing a communications channel to be established between the biometrics unit and a telephony device used by the individual comprises establishing an audio communications channel between the biometrics unit and the telephony device used by the individual, and wherein the step of causing the obtained verification instructions to be conveyed to the individual over the communications channel comprises playing audio verification instructions to the individual over the audio communications channel.

17. The system of claim 13, wherein the step of causing a communications channel to be established between the biometrics unit and a telephony device used by the individual comprises establishing a text-based messaging channel between the biometrics unit and the telephony device used by the individual.

18. The system of claim 17, wherein the step of causing the obtained verification instructions to be conveyed to the individual comprises sending the verification instructions to the individual as part of a message that is sent to the individual's telephony device via the text-based messaging channel.

19. The system of claim 17, wherein the step of receiving spoken audio input from the individual comprises receiving, via the text-based messaging channel, a file containing the spoken audio input.

20. The system of claim 17, wherein obtaining verification instructions comprises receiving text-based instructions, and wherein causing the obtained verification instructions to be sent to the individual comprises sending a text-based message that includes the verification instructions to the individual's telephony device via the text-based messaging channel.

21. The system of claim 17, wherein obtaining verification instructions comprises receiving audio verification instructions, and wherein causing the verification instructions to be sent to the individual comprises sending a file containing the audio verification instructions to the individual's telephony device via the text-based messaging channel.

22. The system of claim 13, wherein the request to verify the identity of an individual is received from a first server controlled by a first entity, and wherein the remote server that is to be notified of the result of the identity verification process is a second server controlled by a second entity that is different from the first entity.

\* \* \* \* \*